(12) United States Patent
Minasov et al.

(10) Patent No.: US 10,913,685 B1
(45) Date of Patent: *Feb. 9, 2021

(54) COMPREHENSIVE MINERAL SUPPLEMENT

(71) Applicant: DIMTOV CORP, Dover, DE (US)

(72) Inventors: Stepan Minasov, Moscow (RU); Sharon Gililov, Moscow (RU)

(73) Assignee: Dimtov Corp., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,015

(22) Filed: Jul. 24, 2020

Related U.S. Application Data

(63) Continuation-in-part of application No. 16/811,078, filed on Mar. 6, 2020, now Pat. No. 10,800,990.

(51) Int. Cl.
| | | |
|---|---|---|
| *C04B 18/02* | (2006.01) | |
| *C04B 18/08* | (2006.01) | |
| *C04B 18/12* | (2006.01) | |
| *C04B 14/04* | (2006.01) | |
| *C10L 1/12* | (2006.01) | |
| *C04B 14/48* | (2006.01) | |
| *C04B 40/00* | (2006.01) | |
| *C10L 9/10* | (2006.01) | |
| *C04B 14/30* | (2006.01) | |

(52) U.S. Cl.
CPC .......... *C04B 18/021* (2013.01); *C04B 14/041* (2013.01); *C04B 14/303* (2013.01); *C04B 14/48* (2013.01); *C04B 18/08* (2013.01); *C04B 18/125* (2013.01); *C04B 40/0046* (2013.01); *C10L 1/1233* (2013.01); *C10L 9/10* (2013.01)

(58) Field of Classification Search
CPC ...... C10L 5/02; C10L 5/04; C10L 9/10; C10L 2200/0204–0245
See application file for complete search history.

(56) References Cited

U.S. PATENT DOCUMENTS

| | | | | |
|---|---|---|---|---|
| 4,839,060 | A * | 6/1989 | Yong ..................... | C01F 7/0653 127/32 |
| 2011/0081284 | A1 * | 4/2011 | Weaver ................... | C22B 7/001 423/138 |
| 2015/0203362 | A1 * | 7/2015 | Amiran .................. | C01G 49/08 75/613 |
| 2015/0284278 | A1 * | 10/2015 | Anderson ............... | C01F 7/005 210/713 |
| 2016/0289791 | A1 * | 10/2016 | Morris ..................... | C01F 7/066 |
| 2016/0333284 | A1 * | 11/2016 | Khadilkar ................ | C10L 5/04 |
| 2019/0100459 | A1 * | 4/2019 | Rocktaschel ....... | C04B 40/0042 |
| 2019/0177178 | A1 * | 6/2019 | Gostu .................. | C07F 15/025 |

\* cited by examiner

*Primary Examiner* — Ellen M McAvoy
(74) *Attorney, Agent, or Firm* — Arent Fox LLP; Michael Fainberg

(57) ABSTRACT

A multifunctional comprehensive mineral supplement containing one or more molecular clusters, wherein each of the one or more molecular clusters has a metal-containing core and one or more ligands attached to the metal-containing core, wherein at least a portion of the metal-containing core and/or the one or more ligands is derived from a mineral component, wherein the mineral component is obtained from at least one mineral source, and wherein the at least one mineral source includes at least one selected from the group consisting of bauxite residue, ultrabasic rock, and a combination thereof.

20 Claims, 2 Drawing Sheets

COMPREHENSIVE MINERAL SUPPLEMENT

PRIORITY INFORMATION

This application is a continuation-in-part application of U.S. patent application Ser. No. 16/811,078, filed on Mar. 6, 2020, the contents of which are expressly incorporated by reference herein in their entirety.

BACKGROUND

Recently, the efficient and safe use of hydrocarbon energy resources has become an increasingly critical issue. One promising route for obtaining the maximum efficiency of hydrocarbon energy resources may be improving the organization of their combustion/burning processes, for example, using catalysts.

In general, catalysts are substances that change the speed of a chemical reaction and/or trigger a chemical reaction and do not change as a result of the reaction. In this way, catalysts provide a faster reaction pathway than the same reaction pathway without a catalyst. This effect is achieved by reducing the activation energy of the reaction. In other words, catalysts reduce the height of the reaction's energy barrier.

A catalyst's mechanism of action generally includes the formation of intermediate compounds with one or more reactants. In the process of interaction, stable chemical compounds are not necessarily required. Rather, interactions can remain at the physical level. In particular, extremely unstable, short-lived (about $10^{-15}$ s) intermediate compounds (i.e., activated complexes) with a lower energy level may be formed, and the reaction rate may increase significantly. At the reaction's completion, the complex is split into the final chemical compound and the catalyst, thereby allowing the catalyst to form another activated complex. Thus, the catalytic cycle may be repeated many times.

The mechanisms of catalytic reactions can be subdivided according to the composition of the catalyst. For example, catalysts can be homogeneous or heterogeneous. While the mechanisms of homogeneous catalytic reactions involving acids (acid catalysis) or bases (base catalysis) have been well-studied, heterogeneous catalysis can currently only be described by some consistent patterns. For example, correlations have been established between the activity of catalysts and the number of d-electrons in cation orbital (for simple oxides), the crystal lattice parameter, electrical conductivity, ion charge and radius, chemical bonding energy, and/or acidity. These correlations are usually based on the catalyst element's position in the periodic system.

It should be understood that only certain catalysts are suitable for each type of reaction. For example, oxidation-reduction catalysts are characterized by the presence of transition metal or its compounds (e.g., $Co^{+3}$, $V_2O_5+MoO_3$). In this case, catalysis is mainly carried out by changing the oxidation state of the transition metal.

Two examples of heterogeneous catalysts are chelates and clusters. An example chelate catalyst is cobalt phthalocyanine, which acts as an oxygen carrier and is used in some gas processing plants to convert mercaptans into disulfides. However, it is not suitable for use as a combustion catalyst because it is destroyed at temperatures above 100° C.

Cluster catalysts may be characterized by highly developed surfaces surrounded by various ligands and are often distributed on an inert carrier (e.g., on silica gel, aluminum oxide, or activated carbon). The initial energy efficiency of such a catalyst may depend directly on the size of the cluster's core. In particular, the ratio of surface atoms to non-surface atoms increases as the particles size decreases. In the case of nanoparticles, almost all atoms are "surface" atoms, so their chemical activity is very high.

One area that would benefit from new, efficient catalysts is the combustion of fuels, especially the combustion of fossil fuels. A desirable catalyst would allow for a significant reduction of fuel consumption as well as a reduction of combustion product emission into the atmosphere. One possibility for providing selective catalytic oxidation of hydrocarbons (e.g., as found in fossil fuels) is the use of nano-sized cluster catalysts. The benefit of such catalysts may be two-fold. In particular, these catalysts may exhibit properties of a discrete molecule, supplemented by the interaction between metals at the molecular level. They may also exhibit properties of an assembly of metal atoms limited by the framework of a single molecule. There is thus a need in the art for new catalysts that provide these beneficial effects.

SUMMARY

The present disclosure is directed to a comprehensive mineral supplement (CMS) for use with fuels, including solid, liquid, and gaseous fuels. The present disclosure is also directed to methods of using the CMS as descried herein, such as in a process for obtaining energy from a fuel while reducing fuel consumption and combustion product emissions. The present disclosure is also directed to methods of making the CMS as described herein.

DETAILED DESCRIPTION

Figure 1:
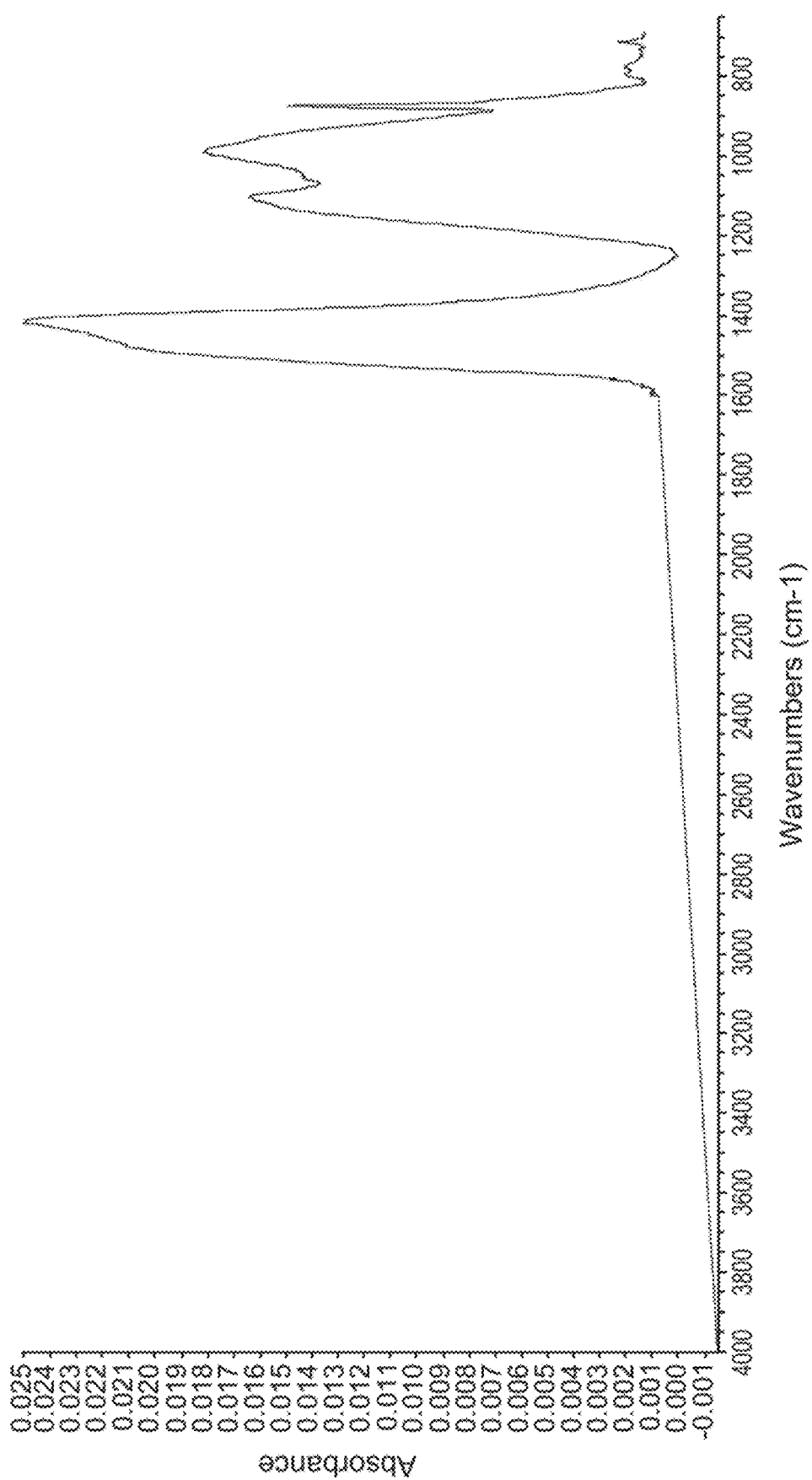
FIG. 1 shows an FTIR spectrum according to Example II.

The present disclosure is directed to a CMS for use with fuels, including solid, liquid, and gaseous fuels. The present disclosure is also directed to methods of using the CMS as descried herein, such as in a process for obtaining energy from a fuel while reducing fuel consumption and combustion product emissions. The present disclosure is also directed to methods of making the CMS as described herein.

As used herein, the term "comprehensive mineral supplement" or "CMS" refers to a substance comprising molecular clusters wherein at least a portion of the molecular clusters comprises a metal-containing core and optionally one or more ligands attached to the metal-containing core. According to some aspects, the CMS may be a solid state substance suitable for use as an additive to fuels as described herein.

The CMS may be a multifunctional CMS. As used herein, the term "multifunctional CMS" refers to a CMS having at least two functions in fuel combustion processes. For example, the multifunctional CMS may function as a catalyst for fuel combustion processes and as an initiator for fuel combustion processes, as described herein.

As used herein, the term "metal-containing core" refers to one or more molecules that each comprises one or more metals, including oxides and hydroxides thereof, and that form the center of a molecular cluster. According to some aspects, the one or more metals may be selected in order to provide the multifunctional effects as described herein. Metals useful according to the present disclosure include, but are not limited to, barium, aluminum, iron, magnesium, titanium, sodium, potassium, calcium, oxides thereof, hydroxides thereof, and combinations thereof.

As used herein, the term "ligand" refers to an ion or molecule bound to the metal-containing core of the molecular cluster. According to some aspects, each molecular cluster comprised by the CMS may comprise one or more types of ligands. In some non-limiting examples, each of the one or more types of ligands may independently be organic, such as an organic molecule. Additionally or alternatively, each of the one or more types of ligands may independently comprise an ion or molecule containing silicon (e.g., a silicate), sulfur (e.g., a sulfide), chlorine (e.g., a chloride), fluorine (e.g., a fluoride), water, a hydroxide, or a combination thereof.

According to some aspects, at least a portion of the ligands as described herein may be short-lived ligands. As used herein, the term "short-lived ligand" refers to a ligand as described herein that separates from the metal-containing core prior to the metal-containing core performing one or more functions, for example, prior to the metal-containing core providing a catalytic and/or initiator function. According to some aspects, the short-lived ligand may separate from the metal-containing core in response to temperature, and in particular, in response to a high temperature. According to some aspects, the high temperature may be the ignition point of a fuel as described herein and/or the temperature required for fuel combustion as described herein. According to some aspects, the high temperature may be between about 350 and 520° C., and optionally between about 400 and 470° C.

According to some aspects, the CMS may comprise a uniformly distributed mixture of molecular clusters as described herein, wherein the molecular clusters are the same or different. According to some aspects, the mixture may be a heterogeneous mixture of molecular clusters, that is, a mixture or two or more different types of molecular clusters (for example, molecule clusters having different metal-containing cores and/or a different composition of ligands).

Non-limiting examples of molecular clusters comprised by the CMS include metal oxide and metal hydroxide clusters, which in their structure to form chelate complexes, for example, a sodium hexafluoroaluminate ($Na_3AlF_6$) chelate, a —Ba— chelate, and combinations thereof. Additionally or alternatively, the molecular clusters may comprise $CaO$, $SiO_2$, $AlO_3$, $SO_3$, $Fe_2O_3$, $Cl$, $K_2O$, $MgO$, $Na_2O$, $BaO$, $TiO_2$, or a combination thereof.

According to some aspects, at least a portion of the ligand(s) comprised by the CMS may be provided by or derived from a mineral component. As used herein, the term "mineral component" refers to a component obtained from a mineral or a mineral source. As used herein, the term "mineral" refers to a naturally-occurring chemical compound, and the term "mineral source" refers to a substance comprising one or more minerals. It should be understood that a mineral component may be a mineral itself or a molecule produced by processing a mineral and/or mineral source as described herein. Non-limiting examples of minerals useful according to the present disclosure include cryolite, sodium, sodium chloride, refractories such as refractory class aluminosilicates (including high-alumina and low-alumina aluminosilicates) and refractory class silica, and graphite. Non-limiting examples of mineral sources useful according to the present disclosure include oil shale ash, coal, fly ash (i.e., a particulate-containing coal combustion product), ultrabasic rock, and bauxite residue.

As used herein, "oil shale ash," alternatively referred to as "coke-ash residue," refers to spent oil shale resulting from a solid heat carrier process for producing synthetic shale oil from oil shale.

As used herein, "bauxite residue" refers to residue of the Bayer process, that is, the industrial process for refining bauxite to produce alumina. According to some aspects, bauxite residue, also referred to as "red mud," comprises a mixture of iron oxide, silica, calcium oxide, titanium dioxide, and optionally residual alumina and/or residual Bayer process extraction chemicals, such as alkaline sodium hydroxide.

As used herein, the term "ultrabasic rock" refers to an igneous rock with a silica content of less than about 45% by weight. Non-limiting examples of ultrabasic rock include, but are not limited to, gabbro, picrite, picrite basalt, and combinations thereof.

As used herein, the term "refractory" and "refractory class" refers to any refractory as per ASTM C71 (i.e., a non-metallic material having those chemical and physical properties that make it applicable for structures or as components of systems that are exposed to environments above 538° C.).

Example refractory materials include, but are not limited to, silica, aluminosilicates (such as fire clay), and combinations thereof. It should be understood that refractory class aluminosilicates may be high-alumina or low-alumina. As used herein, high-alumina refractory class aluminosilicates are refractory class aluminosilicates having an alumina content of greater than about 75% by weight and low-alumina refractory class aluminosilicates are refractory class aluminosilicates having an alumina content of between about 50% and 75% by weight.

It should be understood that the refractories according to the present disclosure may be shaped or unshaped (also referred to herein as "monolithic"). It should be understood that an "unshaped" or "monolithic" refractory may, after curing and dryout, form a solid lining conforming to the geometry of a lined item.

Example shaped refractories include, but are not limited to, bricks (such as fire clay bricks). Example monolithic refractories include, but are not limited to, castables and mortars.

According to some aspects, at least a portion of the metal-containing core(s) comprised by the CMS may be provided by or derived from a mineral component. For example, the metal-containing core(s) may comprise aluminum and/or iron oxide, wherein the aluminum and/or iron oxide is provided at least in part by bauxite residue and/or cryolite. Additionally or alternatively, at least a portion of the metal-containing core(s) comprised by the CMS may be provided by or derived from a non-mineral metal component.

The present disclosure is also directed to methods of making the CMS as described herein. According to some aspects, the method may comprise providing one or more minerals and/or mineral sources as described herein, drying the minerals and/or mineral sources, grinding the minerals and/or mineral sources to provide mineral and/or mineral source particles, optionally providing a slurry containing at least a portion of the mineral and/or mineral source particles, combining the mineral and/or mineral source particles and/or slurries thereof to form a combined mineral composition, combining the combined mineral composition with a metal component, and mixing to provide the CMS as described herein.

According to some aspects, drying the minerals and/or mineral sources may be performed using any drying equipment known in the art useful according to the present disclosure. For example, the drying equipment may be any equipment capable of drying the minerals and/or mineral sources at a temperature of no more than about 100° C.

According to some aspects, grinding the minerals and/or mineral sources to provide the mineral and/or mineral source particles may be performed after the minerals and/or mineral sources have been dried. Grinding the minerals and/or mineral sources may be performed using any grinding equipment known in the art useful according to the present disclosure, such as a planetary mill.

According to some aspects, the minerals and/or mineral sources may be ground to provide particles. According to some aspects, at least a portion of the particles may have an average diameter of from about 1 to about 100 nanometers, optionally from about 1 to 50 nanometers, optionally from about 1 to 25 nanometers, optionally from about 1 to 10 nanometers, optionally from about 1 to 5 nanometers, optionally no more than about 2 nanometers, optionally no more than about 1.9 nanometers, optionally no more than about 1.8 nanometers, optionally no more than about 1.7 nanometers, optionally no more than about 1.6 nanometers, optionally no more than about 1.5 nanometers, and optionally no more than about 1.4 nanometers. Additionally or alternatively, at least a portion of the particles may have an average diameter of no more than about 30 micrometers, optionally no more than about 25 micrometers, optionally no more than about 20 micrometers, and optionally no more than about 15 micrometers. It should be understood that the average diameter, alternatively referred to herein as particle size, may be selected based on the intended application of the CMS, for example, based on the fuel to which the CMS will be added. For example, when the fuel is a liquid fuel, the particles may have an average diameter of no more than about 1.4 to 2 nanometers. In another example, when the fuel is a solid fuel, the particles may have an average diameter of no more than about 25 micrometers.

According to some aspects, all or a portion of the mineral and/or mineral source particles may optionally be provided as a slurry, and the mineral and/or mineral source particles and/or slurries thereof may be combined and optionally mixed (for example, via stirring). It should be understood that all of the mineral and/or mineral source particles and/or slurries thereof may be combined about simultaneously or they may be combined in batches. For example, a first portion of the mineral and/or mineral source particles and/or slurries thereof may be combined and/or mixed to provide a first uniform mass, and a second portion of the mineral and/or mineral source particles and/or slurries thereof may be combined and/or mixed to provide a second uniform mass. The first and second uniform masses may be subsequently combined to provide the combined mineral composition as described herein. It should be understood that the method as described herein may optionally comprise providing third, fourth, fifth, or more uniform masses to be combined with the first and second uniform masses to provide the combined mineral composition.

In one non-limiting example, the mineral and/or mineral source particles may comprise oil shale ash particles, bauxite residue particles, sodium chloride particles, and cryolite particles. In this example, the oil shale ash particles and the bauxite residue may be combined and mixed to form a first uniform mass in a first mixer, and the sodium chloride particles and the cryolite particles may be combined and mixed to form a second uniform mass in a second mixer. The first uniform mass and the second uniform mass may then be combined in a third hopper, with or without mixing, to provide the combined mineral composition, as described herein.

In another non-limiting example, the mineral and/or mineral source particles may comprise oil shale ash particles, bauxite residue particles, sodium chloride particles, and graphite particles. In this example, the oil shale ash particles and the bauxite residue may be combined and mixed to form a first uniform mass in a first mixer, and the sodium chloride particles and the gaphite particles may be combined and mixed to form a second uniform mass in a second mixer. The first uniform mass and the second uniform mass may then be combined in a third hopper, with or without mixing, to provide the combined mineral composition, as described herein.

In another non-limiting example, the mineral and/or mineral source particles may comprise oil shale ash particles, fly ash particles, sodium chloride particles, and cryolite particles. In this example, the oil shale ash particles and the fly ash particles may be combined and mixed to form a first uniform mass in a first mixer, and the sodium chloride particles and the cryolite particles may be combined and mixed to form a second uniform mass in a second mixer. The first uniform mass and the second uniform mass may then be combined in a third hopper, with or without mixing, to provide the combined mineral composition, as described herein.

In another non-limiting example, the mineral and/or mineral source particles may comprise oil shale ash particles, fly ash particles, sodium chloride particles, and graphite particles. In this example, the oil shale ash particles and the fly ash particles may be combined and mixed to form a first uniform mass in a first mixer, and the sodium chloride particles and the graphite particles may be combined and mixed to form a second uniform mass in a second mixer. The first uniform mass and the second uniform mass may then be combined in a third hopper, with or without mixing, to provide the combined mineral composition, as described herein.

In another non-limiting example, the mineral and/or mineral source particles may comprise ultrabasic rock particles, bauxite residue particles, sodium chloride particles, and cryolite particles. In this example, the ultrabasic rock particles and the bauxite residue may be combined and mixed to form a first uniform mass in a first mixer, and the sodium chloride particles and the cryolite particles may be combined and mixed to form a second uniform mass in a second mixer. The first uniform mass and the second uniform mass may then be combined in a third hopper, with or without mixing, to provide the combined mineral composition, as described herein.

In another non-limiting example, the mineral and/or mineral source particles may comprise ultrabasic rock particles, bauxite residue particles, sodium chloride particles, and graphite particles. In this example, the ultrabasic rock particles and the bauxite residue may be combined and mixed to form a first uniform mass in a first mixer, and the sodium chloride particles and the graphite particles may be combined and mixed to form a second uniform mass in a second mixer. The first uniform mass and the second uniform mass may then be combined in a third hopper, with or without mixing, to provide the combined mineral composition, as described herein.

In another non-limiting example, the mineral and/or mineral source particles may comprise ultrabasic rock particles, fly ash particles, sodium chloride particles, and cryolite particles. In this example, the ultrabasic rock particles and the fly ash particles may be combined and mixed to form a first uniform mass in a first mixer, and the sodium chloride particles and the cryolite particles may be combined and mixed to form a second uniform mass in a second mixer. The first uniform mass and the second uniform mass may then be combined in a third hopper, with or without mixing, to provide the combined mineral composition, as described herein.

In another non-limiting example, the mineral and/or mineral source particles may comprise ultrabasic rock particles, fly ash particles, sodium chloride particles, and graphite particles. In this example, the ultrabasic rock particles and the fly ash particles may be combined and mixed to form a first uniform mass in a first mixer, and the sodium chloride particles and the graphite particles may be combined and mixed to form a second uniform mass in a second mixer. The first uniform mass and the second uniform mass may then be combined in a third hopper, with or without mixing, to provide the combined mineral composition, as described herein.

In some non-limiting examples, the combined mineral and/or mineral source particles used to prepare the CMS may comprise or consist of oil shale ash, fly ash, cryolite, and sodium chloride.

In some non-limiting examples, the combined mineral and/or mineral source particles used to prepare the CMS may comprise or consist of oil shale ash, bauxite residue, cryolite, and sodium chloride.

In some non-limiting examples, the combined mineral and/or mineral source particles used to prepare the CMS may comprise or consist of oil shale ash, fly ash, bauxite residue, cryolite, and sodium chloride.

In some non-limiting examples, the combined mineral and/or mineral source particles used to prepare the CMS may comprise or consist of oil shale ash, fly ash, graphite, and sodium chloride.

In some non-limiting examples, the combined mineral and/or mineral source particles used to prepare the CMS may comprise or consist of oil shale ash, bauxite residue, graphite, and sodium chloride.

In some non-limiting examples, the combined mineral and/or mineral source particles used to prepare the CMS may comprise or consist of oil shale ash, fly ash, bauxite residue, graphite, and sodium chloride.

In some non-limiting examples, the combined mineral and/or mineral source particles used to prepare the CMS may comprise or consist of ultrabasic rock, fly ash, cryolite, and sodium chloride.

In some non-limiting examples, the combined mineral and/or mineral source particles used to prepare the CMS may comprise or consist of ultrabasic rock, bauxite residue, cryolite, and sodium chloride.

In some non-limiting examples, the combined mineral and/or mineral source particles used to prepare the CMS may comprise or consist of ultrabasic rock, fly ash, bauxite residue, cryolite, and sodium chloride.

In some non-limiting examples, the combined mineral and/or mineral source particles used to prepare the CMS may comprise or consist of ultrabasic rock, fly ash, graphite, and sodium chloride.

In some non-limiting examples, the combined mineral and/or mineral source particles used to prepare the CMS may comprise or consist of ultrabasic rock, bauxite residue, graphite, and sodium chloride.

In some non-limiting examples, the combined mineral and/or mineral source particles used to prepare the CMS may comprise or consist of ultrabasic rock, fly ash, bauxite residue, graphite, and sodium chloride.

The method may comprise combining the combined mineral composition with a metal component. As used herein, the term "metal component" refers to a component comprising any metal-containing compound useful according to the present disclosure, as described herein. For example, the metal-containing compound may be a compound comprising barium, aluminum, iron, magnesium, titanium, sodium, potassium, calcium, an oxide thereof, a hydroxide thereof, or a combination thereof. Non-limiting examples of metal-containing compounds include, but are not limited to, compounds having the formula $M(OH)_x$, wherein M indicates a metal and OH indicates a hydroxyl group (e.g., barium hydroxide, sodium hydroxide, and potassium hydroxide).

According to some aspects, combining the combined mineral composition with the metal component may be performed with mixing to provide the CMS. According to some aspects, combining the combined mineral composition with the metal component may be performed without mixing, and then the combined mineral composition and metal component combination may be subsequently mixed to provide the CMS.

In some non-limiting examples, the components used to prepare the CMS may comprise or consist of between about 45 and 55% (w/w) oil shale ash, between about 10 and 20% (w/w) bauxite residue, between about 10 and 25% (w/w) cryolite, between about 5 and 20% (w/w) sodium chloride, and between about 1 and 15% (w/w) barium hydroxide. In one non-limiting examples, the components used to prepare the CMS may comprise or consist of 50% (w/w) oil shale ash, 15% (w/w) bauxite residue, 16% (w/w) cryolite, 12% (w/w) sodium chloride, and 7% (w/w) barium hydroxide.

In some non-limiting examples, the components used to prepare the CMS may comprise or consist of between about 45 and 55% (w/w) oil shale ash, between about 10 and 20% (w/w) fly ash, between about 10 and 25% (w/w) cryolite, between about 5 and 20% (w/w) sodium chloride, and between about 1 and 15% (w/w) barium hydroxide. In one non-limiting examples, the components used to prepare the CMS may comprise or consist of 50% (w/w) oil shale ash, 15% (w/w) fly ash, 16% (w/w) cryolite, 12% (w/w) sodium chloride, and 7% (w/w) barium hydroxide.

In some non-limiting examples, the components used to prepare the CMS may comprise or consist of between about 45 and 55% (w/w) oil shale ash, between about 10 and 20% (w/w) bauxite residue, between about 10 and 25% (w/w) graphite, between about 5 and 20% (w/w) sodium chloride, and between about 1 and 15% (w/w) barium hydroxide. In one non-limiting examples, the components used to prepare the CMS may comprise or consist of 50% (w/w) oil shale ash, 15% (w/w) bauxite residue, 16% (w/w) graphite, 12% (w/w) sodium chloride, and 7% (w/w) barium hydroxide.

In some non-limiting examples, the components used to prepare the CMS may comprise or consist of between about 45 and 55% (w/w) oil shale ash, between about 10 and 20% (w/w) fly ash, between about 10 and 25% (w/w) graphite, between about 5 and 20% (w/w) sodium chloride, and between about 1 and 15% (w/w) barium hydroxide. In one non-limiting examples, the components used to prepare the CMS may comprise or consist of 50% (w/w) oil shale ash, 15% (w/w) fly ash, 16% (w/w) graphite, 12% (w/w) sodium chloride, and 7% (w/w) barium hydroxide.

In some non-limiting examples, the components used to prepare the CMS may comprise or consist of between about 45 and 55% (w/w) ultrabasic rock, between about 10 and 20% (w/w) bauxite residue, between about 10 and 25%

(w/w)) oil shale ash, between about 10 and 20% (w/w) fly ash, between about 10 and 25% (w/w) cryolite, between about 5 and 20% (w/w) sodium chloride, and between about 1 and 15% (w/w) barium hydroxide. In one non-limiting examples, the components used to prepare the CMS may comprise or consist of 50% (w/w) ultrabasic rock, 15% (w/w) bauxite residue, 16% (w/w)) oil shale ash, between about 10 and 20% (w/w) fly ash, between about 10 and 25% (w/w) cryolite, 12% (w/w) sodium chloride, and 7% (w/w) barium hydroxide.

In some non-limiting examples, the components used to prepare the CMS may comprise or consist of between about 45 and 55% (w/w) ultrabasic rock, between about 10 and 20% (w/w) fly ash, between about 10 and 25% (w/w)) oil shale ash, between about 10 and 20% (w/w) fly ash, between about 10 and 25% (w/w) cryolite, between about 5 and 20% (w/w) sodium chloride, and between about 1 and 15% (w/w) barium hydroxide. In one non-limiting examples, the components used to prepare the CMS may comprise or consist of 50% (w/w) ultrabasic rock, 15% (w/w) fly ash, 16% (w/w)) oil shale ash, between about 10 and 20% (w/w) fly ash, between about 10 and 25% (w/w) cryolite, 12% (w/w) sodium chloride, and 7% (w/w) barium hydroxide.

In some non-limiting examples, the components used to prepare the CMS may comprise or consist of between about 45 and 55% (w/w) ultrabasic rock, between about 10 and 20% (w/w) bauxite residue, between about 10 and 25% (w/w) graphite, between about 5 and 20% (w/w) sodium chloride, and between about 1 and 15% (w/w) barium hydroxide. In one non-limiting examples, the components used to prepare the CMS may comprise or consist of 50% (w/w) ultrabasic rock, 15% (w/w) bauxite residue, 16% (w/w) graphite, 12% (w/w) sodium chloride, and 7% (w/w) barium hydroxide.

In some non-limiting examples, the components used to prepare the CMS may comprise or consist of between about 45 and 55% (w/w) ultrabasic rock, between about 10 and 20% (w/w) fly ash, between about 10 and 25% (w/w) graphite, between about 5 and 20% (w/w) sodium chloride, and between about 1 and 15% (w/w) barium hydroxide. In one non-limiting examples, the components used to prepare the CMS may comprise or consist of 50% (w/w) ultrabasic rock, 15% (w/w) fly ash, 16% (w/w) graphite, 12% (w/w) sodium chloride, and 7% (w/w) barium hydroxide.

According to some aspects, all or a portion of the bauxite residue may be replaced by any refractory class high-alumina aluminosilicate, any refractory class low-alumina aluminosilicate, refractory class silica, or a combination thereof in any of the non-limiting examples described herein.

The present disclosure is also directed to methods of using the CMS as descried herein, such as in a process for obtaining energy from a fuel while reducing fuel consumption and combustion product emissions. According to some aspects, the method may comprise combining the CMS with a fuel and obtaining energy from the fuel via combustion by any known process and/or device as known in the art useful according to the method as described herein.

According to some aspects, the fuel may comprise one or more hydrocarbons. In one example, the fuel may comprise or consist of a fossil fuel, such as petroleum, coal, natural gas, derivatives thereof (e.g., kerosene and propane), firewood, pellets, sawdust, briquettes, peat briquettes, and combinations thereof. According to some aspects, the fuel may comprise a solid, a liquid, a gas, or a combination thereof. The fuel may be useable in boilers, furnaces, thermal power plants, internal combustion engines, and/or similar devices capable of obtaining energy from the fuel via combustion.

The method may comprise combining the CMS with the fuel in an amount that increases the combustion rate of the fuel compared with the fuel's combustion rate without the CMS. For example, the CMS may function as a catalyst that lowers the ignition point of the fuel as compared with the ignition point of the fuel without the CMS. It should be understood that as used herein, the term "ignition point" refers to the lowest temperature at which a combustible substance in air will ignite. Generally, a fuel's ignition point is inversely related to its combustion rate, that is, lowering the ignition point of the fuel will increase its combustion rate. In this way, the CMS may increase a fuel's combustion rate.

Alternatively or additionally, the CMS may be combined with the fuel in an amount such that the CMS decreases oxidation of the fuel in the earlier combustion stages, the earlier combustion stages being characterized by a greater available oxygen content as compared with later and final combustion stages. For example, the CMS may function as a catalyst that decreases the oxidation rate of the fuel in earlier combustion stages, thereby preventing the formation of peroxides, and optionally increases the combustion rate of the fuel in later and final combustion stages as described herein. In this way, the CMS may provide for a more extensive and constant combustion process, thus creating a uniform structure and external combustion atmosphere in the inner space of the power installation (e.g., a "dome" with laminar effect), which may reduce the tension and corrosion of the walls of the combustion device and thereby increase its life.

Additionally or alternatively, the CMS may be combined with the fuel in an amount such that the CMS functions as an initiator, and in particular, as an initiator in the late and final stages of fuel combustion. In this example, the CMS may provide oxygen in the late and final stages of fuel combustion, thereby providing a greater degree of combustion at lower temperatures and/or a deeper pyrolysis of non-evaporated fuel as compared with these characteristics without the CMS. It should be understood that the CMS according to the present disclosure may thus increase the octane number of the fuel.

Additionally or alternatively, the CMS may be combined with the fuel in an amount that reduces undesirable combustion product formation and/or release as compared with the undesirable combustion product formation and/or release of the fuel without the CMS. For example, according to some aspects, the CMS may after-burn (i.e., additionally oxidize) exhaust gasses created by fuel combustion. In this way, the CMS may function as an initiator that reduces the formation and/or release of undesirable combustion products.

According to some aspects, the CMS may be combined with the fuel to provide a CMS concentration that provides one or more of the above effects. It should be understood that the CMS concentration may depend, at least in part, on the fuel identity. In one non-limiting example, when the fuel is a solid, the CMS may be provided at a concentration of between about 0.01 and 5% (w/w), optionally between about 0.01 and 2% (w/w), optionally between about 0.01 and 1% (w/w), optionally between about 0.2 and 0.5% (w/w), and optionally about 0.5% (w/w). In another non-limiting example, when the fuel is a liquid, the CMS may be provided at a concentration of between about 0.01 and 2% (w/v), optionally between about 0.01 and 1% (w/v), optionally between about 0.01 and 0.5% (w/v), and optionally between about 0.05 and 0.1% (w/v).

The present disclosure is also directed to a CMS/fuel mixture comprising one or more CMSs and one or more fuels as described herein.

It should be understood that the CMS according to the present disclosure may provide for efficient use of hydrocarbon energy resources, thereby significantly reducing their consumption while increasing the resource of the power installation and reducing the toxicity of the exhaust gases by several times.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

This detailed description uses examples to present the disclosure, including the preferred aspects and variations, and also to enable any person skilled in the art to practice the disclosed aspects, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

EXAMPLES

Example I: Preparation of Multifunctional CMS

First, oil shale ash, bauxite residue, sodium chloride, cryolite, and barium hydroxide were separately dried with drying equipment at a temperature not exceeding 100° C. The materials were then separately ground in a planetary mill to an average particle size of between 10 and 50 micrometers to provide separate bulk materials.

Then, 520 g of the oil shale ash bulk material and 160 g of the bauxite residue bulk material were mixed to a first uniform mass in a first mixer. In a second mixer, 170 g of the sodium chloride and 120 g of the cryolite bulk material were stirred to a second uniform mass. Then, the first uniform mass and the second uniform mass were poured into one mixer hopper. Without mixing, 30 g of barium hydroxide was added to the mixer hopper, and the resulting combination was mixed to a homogeneous mass, which was a CMS additive for use in solid fuel.

It was determined that graphite may also be used in the method of Example I, for example, in place of cryolite.

It was also determined that fly ash may be used in the method of Example I, for example, in addition to the components described therein and/or in place of bauxite residue.

It was also determined that fly ash may be dried with or without grinding as described herein.

It was also determined that any refractory class high-alumina aluminosilicate, any refractory class low-alumina aluminosilicate, refractory class silica, or a combination thereof may be used in the method of Example I, for example, in addition to the components described therein and/or in place of all or a portion of the bauxite residue.

It was also determined that any ultrabasic rock, such as gabbro, picrite, picrite basalt, and combinations thereof, may be used in the method of Example I, for example, in addition to the components described therein and/or in place of all or a portion of the oil shale ash.

Example II: FTIR Analysis of Multifunctional CMS

Fourier-transform infrared spectroscopy (FTIR) was used to study the CMS prepared according to Example I. In FTIR analyses, absorption bands appear as a result of transitions between the vibrational levels of the main electronic state of the system under study. Spectral characteristics (e.g., positions of band maximums, half-width, and intensity of the bands) of an individual molecule depend on the masses of its constituent atoms, geometry of structure, special features of interatomic forces, charge distribution, etc.

A Nicolet™ iS10 FTIR spectrometer was used to study the CMS additive prepared according to Example I (frustrated total internal reflection, germanium crystal, spectral band 4000-600 cm$^{-1}$). FIG. 1 shows the resulting FTIR spectrum.

Example III: Electron Probe Microanalysis of Multifunctional CMS

Electron probe microanalysis was also used to study the CMS prepared according to Example I. In electron probe microanalyses, an electron beam of about 0.5 microns in diameter and with an energy of 5-50 KeV falls on the surface of a sample and, interacting with its atoms, generates characteristic x-ray radiation. By measuring the wavelength and intensity of this radiation, it is possible to determine which elements are present in the sample, their distribution with localization of about 1 μm, and their concentration.

Figure 2:
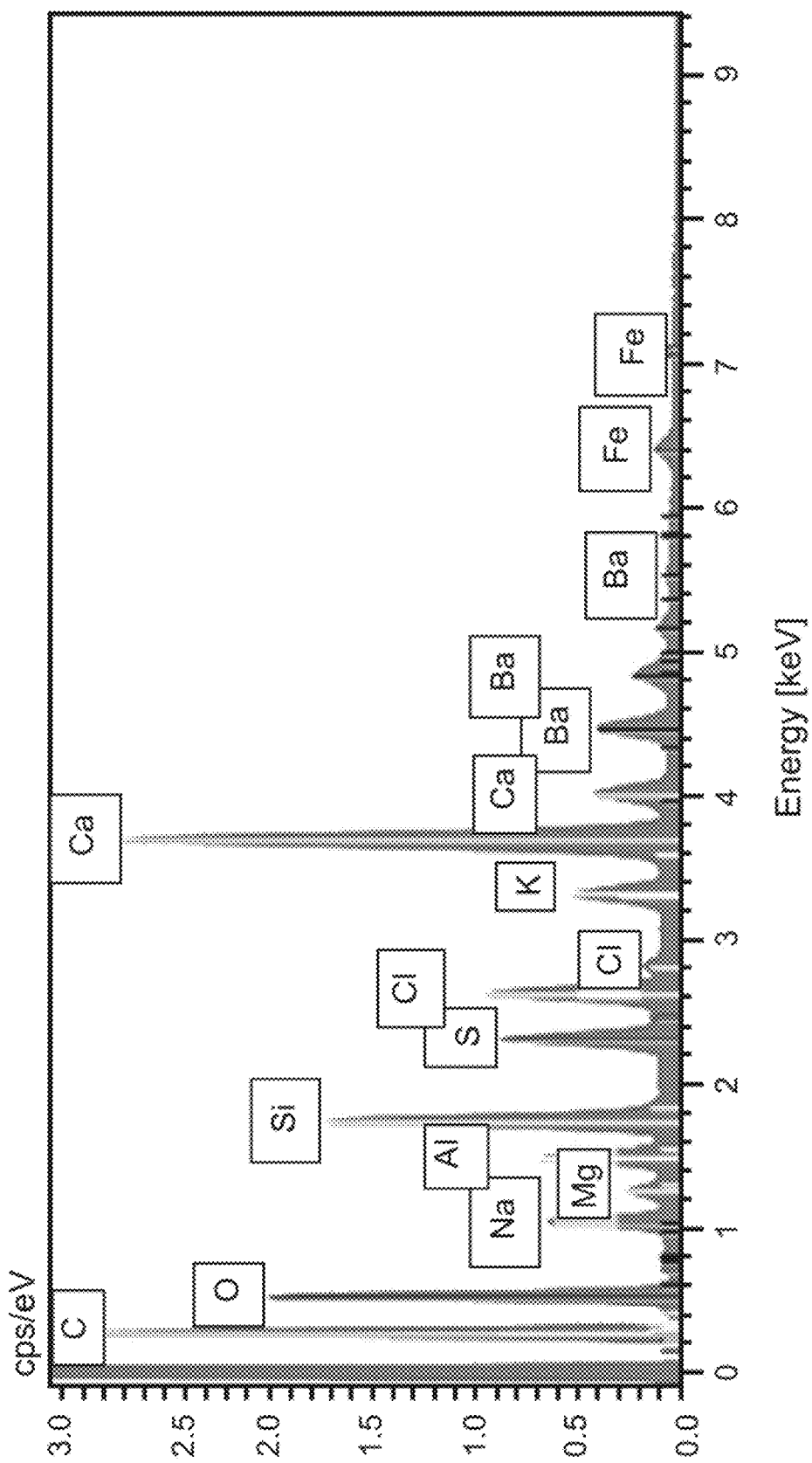
FIG. 2 shows an energy dispersion spectrum according to Example III.

An EDS Oxford AZtecOne energy dispersive spectrometer was used to study the CMS additive prepared according to Example I. FIG. 2 shows the resulting energy dispersion spectrum.

Example IV: Analytic Analysis of Multifunctional CMS

A sample of the CMS prepared according to Example I was tested on contents of Ca, Si, Al, S, Fe, K, Mg, Na, Ba, and Ti (calculated as oxides) and Cl using x-ray spectrometry on the analytical complex ARL™ 9900 WorkStation™ IP3600. The relative standard deviation was determined to be 5-7% relative for main components. The results are shown in Table 1.

TABLE 1

| Component | Concentration (% wt) |
|---|---|
| CaO | 39.4 |
| SiO | 24.0 |
| Al$_2$O$_3$ | 8.6 |
| SO$_3$ | 7.8 |
| Fe$_2$O$_3$ | 4.9 |
| Cl | 3.3 |
| K$_2$O | 3.6 |
| MgO | 3.4 |
| Na$_2$O | 2.8 |
| BaO | 1.2 |
| TiO$_2$ | 0.6 |

It was determined that the sample was radiologically safe with a specific natural radioactivity of no more than $1 \cdot 10^{-11}$ Ci/g.

The total impurities of the sample were also analyzed using Spark Source Mass Spectrometry, specifically by using the JMS-01-BM2 double focus mass spectrometer manufactured by JEOL (Japan). The relative standard deviation was determined to be 15-30% relative for impurities.

The results are shown in Table 2.

TABLE 2

| Element | Concentration |
|---|---|
| H | NO DATA |
| Li | 31 ppm |
| Be | <0.01 |
| B | 95 ppm |
| C | NO DATA |
| N | NO DATA |
| O | MATRIX |
| F | 1000 ppm |
| Na | 2.0% |
| Mg | 2.1% |
| Al | 4.6% |
| Si | 11.2% |
| P | 480 ppm |
| S | 3.2% |
| Cl | 3.3% |
| K | 3.0% |
| Ca | 2.4% |
| Sc | 9 ppm |
| Ti | 0.4% |
| V | 28 ppm |
| Cr | 48 ppm |
| Mn | 500 ppm |
| Fe | 3.5% |
| Co | 5 ppm |
| Ni | 10 ppm |
| Cu | 18 ppm |
| Zn | 100 ppm |
| Ga | 20 ppm |
| Ge | <0.1 ppm |
| As | 40 ppm |
| Se | 10 ppm |
| Br | 200 ppm |
| Rb | 200 ppm |
| Sr | 500 ppm |
| Y | 9 ppm |
| Zr | 20 ppm |
| Nb* | NO DATA |
| Mo | <0.1 ppm |
| Ru | <0.1 ppm |
| Rh | <0.1 ppm |
| Pd | <0.1 ppm |
| Ag | <0.1 ppm |
| Cd | <0.1 ppm |
| In | <0.1 ppm |
| Sn | 27 ppm |
| Sb | <0.1 ppm |
| Te | <0.1 ppm |
| I | 9 ppm |
| Cs | <5 ppm |
| Ba | 1% |
| La | <3 ppm |
| Ce | <1 ppm |
| Pr | <1 ppm |
| Nd | <1 ppm |
| Sm | <1 ppm |
| Eu | <1 ppm |
| Gd | <1 ppm |
| Tb | <1 ppm |
| Dy | <1 ppm |
| Ho | <1 ppm |
| Er | <1 ppm |
| Tm | <1 ppm |
| Yb | <1 ppm |
| Lu | <1 ppm |
| Hf | <2 ppm |
| Ta* | NO DATA |
| W | <2 ppm |
| Re | <2 ppm |
| Os | <2 ppm |
| Ir | <2 ppm |
| Pt | <2 ppm |
| Au | <2 ppm |
| Hg | <2 ppm |
| Tl | <2 ppm |
| Pb | 19 ppm |
| Bi | <2 ppm |
| Th | <2 ppm |
| U | <2 ppm |

In Table 2, Nb and Ta are materials of ion source. MATRIX signifies a notably high content of this element as compared with others.

The loss on ignition (LOI) of the sample was also determined via gravimetry. The calculated LOI of the sample was 8.6 wt %.

The invention claimed is:

1. A multifunctional comprehensive mineral supplement comprising:
   one or more molecular clusters, wherein each of the one or more molecular clusters comprises:
   a metal-containing core, and
   one or more ligands attached to the metal-containing core;
   wherein at least a portion of the metal-containing core and/or the one or more ligands is derived from a mineral component,
   wherein the mineral component is obtained from at least one mineral source, and
   wherein the at least one mineral source comprises at least one selected from the group consisting of bauxite residue, ultrabasic rock, and a combination thereof.

2. The multifunctional comprehensive mineral supplement according to claim 1, wherein the metal-containing core comprises barium, aluminum, iron, magnesium, titanium, sodium, potassium, calcium, an oxide thereof, a hydroxide thereof, or a combination thereof.

3. The multifunctional comprehensive mineral supplement according to claim 1, wherein at least one of the one or more ligands comprises silicon, sulfur, chlorine, fluorine, water, a hydroxide, or a combination thereof.

4. The multifunctional comprehensive mineral supplement according to claim 1, wherein at least one of the one or more ligands is a short-lived ligand.

5. The multifunctional comprehensive mineral supplement according to claim 1, wherein the at least one mineral source comprises at least bauxite residue.

6. The multifunctional comprehensive mineral supplement according to claim 5, wherein the at least one mineral source further comprises oil shale ash, coal, fly ash, or a combination thereof.

7. The multifunctional comprehensive mineral supplement according to claim 6, wherein the mineral component is also obtained from at least one mineral selected from the group consisting of cryolite, sodium chloride, refractory class high-alumina aluminosilicates, refractory class low-alumina aluminosilicates, silica, graphite, and combinations thereof.

8. The multifunctional comprehensive mineral supplement according to claim 1, wherein the at least one mineral source comprises at least ultrabasic rock.

9. The multifunctional comprehensive mineral supplement according to claim 8, wherein the at least one mineral source further comprises oil shale ash, coal, fly ash, or a combination thereof.

10. The multifunctional comprehensive mineral supplement according to claim 9, wherein the mineral component is also obtained from at least one mineral selected from the group consisting of cryolite, sodium chloride, refractory class high-alumina aluminosilicates, refractory class low-alumina aluminosilicates, silica, graphite, and combinations thereof.

11. The multifunctional comprehensive mineral supplement according to claim 1, wherein the ultrabasic rock comprises at least one of gabbro, picrite, picrite basalt, and any combination thereof.

12. A method of making a multifunctional comprehensive mineral supplement comprising:
    grinding at least a portion of one or more dried minerals and/or dried mineral sources to provide mineral and/or mineral source particles,
    combining the mineral and/or mineral source particles to form a combined mineral composition,
    combining the combined mineral composition with a metal component, and
    mixing the combined mineral composition and metal component to provide the multifunctional comprehensive mineral supplement,
    wherein the dried mineral source comprises at least one selected from the group consisting of bauxite residue, ultrabasic rock, and a combination thereof.

13. The method according to claim 12, wherein the one or more dried mineral sources comprises at least bauxite residue.

14. The method according to claim 13, wherein the one or more dried mineral sources comprises oil shale ash, coal, fly ash, or a combination thereof.

15. The method according to claim 12, wherein the one or more dried minerals is selected from the group consisting of cryolite, sodium chloride, refractory class high-alumina aluminosilicates, refractory class low-alumina aluminosilicates, silica, graphite, and combinations thereof.

16. The method according to claim 12, wherein the one or more dried mineral sources comprises at least ultrabasic rock.

17. The method according to claim 16, wherein the one or more dried mineral sources further comprises oil shale ash, coal, fly ash, or a combination thereof.

18. The method according to claim 12, wherein the ultrabasic rock comprises at least one of gabbro, picrite, picrite basalt, and any combination thereof.

19. The method according to claim 12, wherein the metal component comprises barium hydroxide.

20. The method according to claim 12,
    wherein the multifunctional comprehensive mineral supplement comprises one or more molecular clusters, and
    wherein each of the one or more molecular clusters comprises:
    a metal-containing core, and
    one or more ligands attached to the metal-containing core;
    wherein at least a portion of the metal-containing core and/or the one or more ligands contains a mineral component obtained from the one or more dried mineral sources.

* * * * *